US011970886B2

(12) United States Patent
Peters et al.

(10) Patent No.: US 11,970,886 B2
(45) Date of Patent: Apr. 30, 2024

(54) ACTUATOR FOR MOTOR VEHICLE APPLICATIONS

(71) Applicant: Kiekert AG, Heiligenhaus (DE)

(72) Inventors: Jan Hendrik Peters, Wuppertal (DE); Thomas Welke, Essen (DE)

(73) Assignee: Kiekert AG, Heiligenhaus (DE)

(*) Notice: Subject to any disclaimer, the term of this patent is extended or adjusted under 35 U.S.C. 154(b) by 990 days.

(21) Appl. No.: 16/772,871

(22) PCT Filed: Nov. 22, 2018

(86) PCT No.: PCT/DE2018/100955
§ 371 (c)(1),
(2) Date: Feb. 4, 2021

(87) PCT Pub. No.: WO2019/114861
PCT Pub. Date: Jun. 20, 2019

(65) Prior Publication Data

US 2021/0164269 A1 Jun. 3, 2021

(30) Foreign Application Priority Data

Dec. 14, 2017 (DE) ..................... 10 2017 129 897.5

(51) Int. Cl.
*E05B 79/20* (2014.01)
*D01F 6/04* (2006.01)
(Continued)

(52) U.S. Cl.
CPC ................ *E05B 79/20* (2013.01); *D01F 6/04* (2013.01); *E05F 15/643* (2015.01); (Continued)

(58) Field of Classification Search
CPC ......... E05B 79/20; E05F 11/48; E05F 11/481; E05F 11/483; E05F 11/54; E05F 15/60; E05F 15/643; F16C 1/20
(Continued)

(56) References Cited

U.S. PATENT DOCUMENTS 7,331,269 B2 * 2/2008 He ........................... D07B 1/04
57/232
10,011,945 B2 * 7/2018 Wen ...................... B60T 11/046
(Continued)

FOREIGN PATENT DOCUMENTS

DE 202010012379 U1 12/2011
DE 102013109912 A1 3/2015
(Continued)

OTHER PUBLICATIONS

American Chemistry Society melting points of plastics; retrieved via Google NPL search. (Year: 2016).*
(Continued)

*Primary Examiner* — Jason S Daniels
(74) *Attorney, Agent, or Firm* — Renner, Otto, Boisselle & Sklar, LLP

(57) ABSTRACT

An actuator for motor vehicle applications, in particular a motor vehicle door actuator, includes a manually or electromotively operating drive. Furthermore, a flexible drive means which is connected to the drive and can be acted upon by the latter is realized. Additionally provided is an actuating member driven by the drive means. According to the invention, the drive means is produced predominantly from plastic.

16 Claims, 1 Drawing Sheet

(51) Int. Cl.
*E05F 15/643* (2015.01)
*E05F 15/627* (2015.01)

(52) U.S. Cl.
CPC ....... *E05F 15/627* (2015.01); *E05Y 2201/654* (2013.01); *E05Y 2800/676* (2013.01); *E05Y 2900/531* (2013.01)

(58) Field of Classification Search
USPC ........................................................ 296/146.4
See application file for complete search history.

(56) References Cited

U.S. PATENT DOCUMENTS

| | | | | |
|---|---|---|---|---|
| 10,132,006 | B2 * | 11/2018 | Klein .................... | D06M 15/00 |
| 10,370,874 | B2 * | 8/2019 | Rosales ................... | E05B 79/22 |
| 2003/0005681 | A1 * | 1/2003 | He ........................... | D04C 1/12 87/8 |
| 2010/0204427 | A1 * | 8/2010 | Ren ........................... | D01F 6/46 264/210.8 |
| 2015/0143942 | A1 * | 5/2015 | Lalonde ................ | B29C 70/766 74/502.5 |
| 2018/0345766 | A1 * | 12/2018 | Urano ........................ | B60J 5/06 |

FOREIGN PATENT DOCUMENTS

| | | | |
|---|---|---|---|
| DE | 102014017485 | A1 | 5/2015 |
| DE | 102014109055 | A1 | 12/2015 |
| EP | 1811107 | A2 | 7/2007 |
| EP | 2151511 | A1 | 2/2010 |
| WO | 2007062977 | A1 | 6/2007 |
| WO | 2014194878 | A2 | 12/2014 |

OTHER PUBLICATIONS

Translation of International Search Report dated Mar. 8, 2019 for International Patent Application No. PCT/DE2018/100955.

* cited by examiner

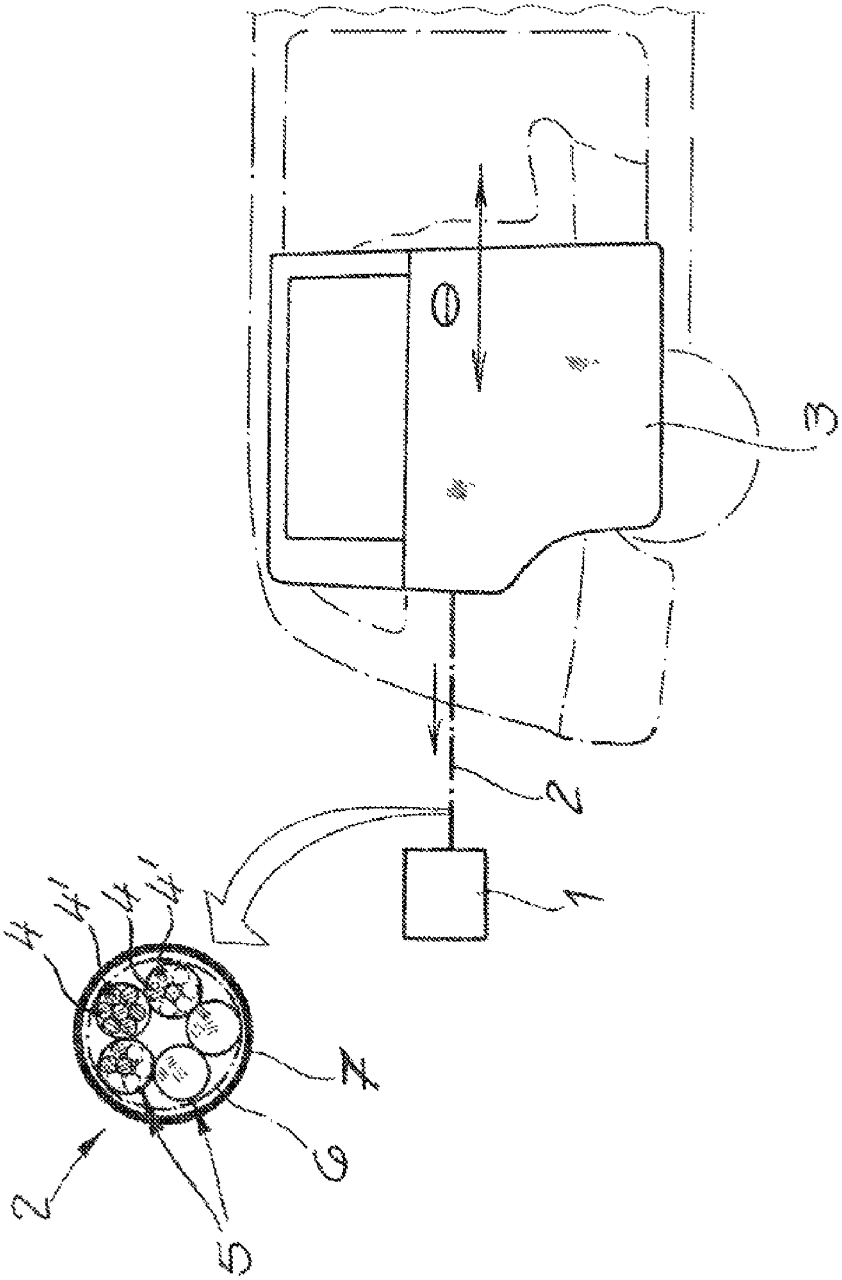
3
2
1
4
4'
7
6
5
2

ACTUATOR FOR MOTOR VEHICLE APPLICATIONS

FIELD OF INVENTION

The invention relates to an actuator for use in motor vehicles, in particular a motor vehicle door actuator, comprising a drive that operates either manually or by means of an electric motor, further comprising a flexible drive means that is connected to the drive and on which said drive can act, and comprising an actuating member that is driven by the drive means.

BACKGROUND OF INVENTION

Various designs of actuators for use in motor vehicles are known. Therefore, these include closure drives for a motor vehicle door lock, for example. These generally draw on a drive that operates by means of an electric motor. The actuator can likewise be used in connection with locking a sealable tank filler neck. In this case, the drive may operate manually, such that, for example, a handle is acted upon by a user in the motor vehicle interior. An electric motor-driven drive is also conceivable in this connection. Such actuators are likewise used when locking and releasing a charging socket and a charging plug in an electric or hybrid vehicle, for example. In this case, an electric motor-driven drive is usually used.

Similar actuators are used to function as a window regulator, for example. In this case, too, an electric motor-driven drive is usually provided for the flexible drive means. The driven actuating member is the windowpane to be raised and lowered. Furthermore, actuators are known that function as an emergency operation device in conjunction with a lock arrangement for vehicle doors or vehicle flaps, as described in DE 10 2013 109 912 A1. At this point, a handling element is provided, the end of which a user's fingers manually grasp in the event of an emergency operation and consequently provide the manual drive.

In a generic actuator for use in motor vehicles according to DE 20 2010 012 379 U1, the electric motor-driven drive in said actuator operates on a locking element as a flexible drive means by means of a Bowden cable, which element constitutes the actuating member. In this way, a fuel filler flap or the connection between a charging plug and a charging socket can be locked and unlocked, for example.

Lastly, the prior art also includes motor vehicle door actuators, as are described in the likewise generic DE 10 2014 109 055 A1. Here, said actuator is a sliding door drive comprising a flexible drive means in the form of a cable, which can be wound and unwound along a groove.

In addition, a guide element that is movably guided on a receptacle is provided. The guide element is a cable grommet. The cable is designed as a steel cable, as is customary.

The prior art cannot be satisfactory in all aspects. Therefore, the steel cables typically used for such actuators as flexible drive means are associated with the fundamental disadvantage that they can corrode over long time scales, for example. Here, attempts are made to lengthen the service life by means of plastics material coatings and to concurrently reduce the friction between the steel cable and any surrounding cable sheath. Furthermore, steel cables have a substantial weight, since large forces often have to be transmitted at this point from the drive to the flexible drive means, for example, in motor vehicle door actuators and in particular sliding door drives. This is likewise applicable when the sliding door has, for example, frozen, for example in the event of increasing wear of associated guides for the sliding door. Due to the often solid design of such steel cables and associated drums, a relatively large amount of installation space is also required. This is where the invention intends to provide a remedy.

SUMMARY OF INVENTION

The technical problem of the invention is to develop an actuator for use in motor vehicles that has the structure described at the outset, so as to reduce the installation space and the weight in particular.

In order to solve this technical problem, a generic actuator for use in motor vehicles within the context of the invention is characterized in that the drive means is predominantly made of plastics material. In this case, the invention firstly proceeds from the knowledge that plastics materials typically have a density in the region of approximately 1 $g/cm^3$, whereas densities in the region of approximately 8 $g/cm^3$ are observed for steel. As a result, the weight of a plastics material cable as the flexible drive means can in principle be considerably reduced in comparison with a steel cable. The high degree of flexibility of a drive means made of plastics material, without resulting resistive forces as occur when bending a steel cable, allows for a far more compact installation option that has a very positive effect, in particular in the event of a lack of installation space in vehicles. In particular, it is advantageous that drive means made of plastics material, for example plastics material fibers, can be wound into smaller coils than can steel cables, and therefore the installation space for corresponding rolls and drives can be reduced.

Advantageous developments of and improvements to the invention are stated in the disclosure. It should be noted that the exemplary embodiments described in the following in order to explain the invention are not restrictive, but instead there are numerous possible combinations and variations of the features in order to carry out the invention, which are described in the description, with reference to the drawings.

If, in addition and within the context of an advantageous variant, the plastics material is then high-tensile with tensile strength values of more than 1 GPa, even tensile strengths that at least correspond to those of alloyed steels (approx. 1 GPa), but generally even exceed these more or less clearly, can be achieved depending on the material. This is because the high-tensile plastics material used can preferably be formed having tensile strengths of more than 2 GPa, and preferably more than 3 GPa (gigapascals).

The plastics material that is advantageously used at this point is generally a polymer, in particular a thermoplastic polymer, and is preferably polyethylene. In fact, at this point plastics material fibers are predominantly used for the drive means. This means that the drive means is mainly composed of plastics material fibers. Within the context of the invention, this means that the proportion by weight of said plastics material fibers is more than 50 wt. % based on the drive means.

At this point, particularly suitable plastics material fibers are formed as HPPE (High Performance Polyethylene) fibers. These fibers reach the previously specified tensile strength values of up to 4 GPa. This can essentially be attributed to the fact that, for the HPPE fibers that are advantageously used, a strong parallel orientation of the polyethylene linear molecules is observed, which is generally greater than 95%. In addition, the degree of crystallinity of such HPPE fibers is up to 85%.

As a result, said plastics material fibers have a fineness-based maximum tensile force of at least 20 cN/dtex. Such fineness-based maximum tensile forces of 20 cN/dtex are not only achieved by the HPPE plastic fibers that are particularly preferably used and are described above, but polyamides, and in particular aromatic polyamides such as aramid, which polyamides likewise belong to the thermoplastics polymers that are preferably used, also show such values, for example. In fact, a fineness-based maximum tensile force of approximately 23 cN/dtex is observed for such aramid fibers.

In contrast, the fineness-based maximum tensile force of steel is only 2 cN/dtex. This means that, while the tensile strength remains the same as for a steel fiber, the plastics material fiber used according to the invention can have a fineness that is only 10% of that of the steel fiber. Since the fiber fineness (in dtex) directly provides evidence of the mass of the relevant plastics material fibers, and since 1 dtex corresponds to 1 gram per 1000 meters, a steel fiber is consequently approximately ten times the mass of the plastics material fiber used according to the invention.

As a result, the weight of the flexible drive means used according to the invention can be reduced by more than 90% while the tensile strength does not change or is preset. In addition, the volume of the particular plastics material fibers or a plastics material thread composed thereof or a plastics material cable is reduced. In fact, in comparison with a steel cable having the same tensile strength, for example, reductions in diameter of at least 10% are observed, and therefore the installation space required can also be reduced at the same time. This can optimize the installation conditions as a whole.

This is all the more applicable when the plastics material fibers have a fineness-based maximum tensile force of at least 30 cN/dtex. At this point, suitable plastics material fibers are HPPE plastics material fibers, which are known in practice under the brand name “Dyneema” and are supplied by Royal DSM N. V., inter alia. In fact, the recourse to such plastics material fibers leads to a further reduction in the weight and installation space.

As already indicated at the outset, the plastics material fibers for forming the flexible drive means can be predominantly made of plastics material to form one or more threads or plastics material threads. Alternatively, or in addition, the plastics material fibers or plastics material threads can also be twisted together. One or more plastics material cables are then observed.

Another alternative is that the flexible drive means is formed as a composite structure of plastics material fibers as the main component and at least one additional component. This means that more than 50 wt. % of the flexible drive means consists of the plastics material fibers. The additional component can accordingly make up a maximum proportion of less than 50 wt. % of the flexible drive means. The invention recommends steel fibers, natural fibers, different plastics material fibers, carbon fibers, glass fibers, etc., for example, as conceivable additional components.

This means that the flexible drive means can be formed as a plastics material thread, for example. This plastics material thread may, on the one hand, consist of the HPPE plastics material fibers already previously described in detail and, on the other hand, polyamide fibers as the additional component. The HPPE plastics material fibers and polyamide fibers or polyamide plastics material fibers can also be stranded by being twisted together to form the plastics material cables. The polyamide fibers or polyamide plastics material fibers are plastics material fibers made of a different material from the HPPE plastics material fibers. Furthermore, compounds of the plastics material fibers described with steel fibers, or carbon fibers or glass fibers are conceivable and are covered according to the invention.

As a result, a novel actuator is provided for use in motor vehicles, which has substantial recourse to a drive means predominantly made of plastics material. Since at this point high-tensile plastics material fibers are advantageously predominantly used, a considerable reduction in weight and, at the same time, a reduction in the installation space required are observed. Another advantage is that flexible drive means predominantly made of plastics material lead to improvements with regard to the coefficients of friction thereof compared with steel cables used in practice. This means that any abrasion is reduced at contact and bearing points, since plastics material/steel material combinations are typically observed for the friction here. Coefficients of friction associated therewith are lower than coefficients of friction that are observed in the prior art in the event of steel/steel friction.

In addition, the high-tensile plastics material fibers that are advantageously used for motor vehicle applications are ideal. This is because the HPPE plastics material fibers often used at this point generally have a melting point that is considerably higher than 140° C. Such plastics materials can even be used up to minus 150° C., and therefore the overall temperature range for motor vehicle applications of from minus 60° C. to plus 70° C. or plus 80° C., for example, is covered without any problems.

In addition, the high-tensile plastics material fibers used are chemically resistant, in particular with regard to resistance to moisture, UV rays and chemicals as well as to oily substances and lubricants. For this reason, too, such plastics materials or plastics material fibers are ideal for use in motor vehicles. This is where the substantial advantages can be seen.

Additional measures that improve the invention can be found in the following description of one exemplary embodiment of the invention, which is shown schematically in the drawing. All the features and/or advantages that are clear from the description or the drawing, including design details, spatial arrangements and method steps, may be essential to the invention, both on their own and in a wide variety of combinations. It should be noted here that the drawing only has descriptive character and is not intended to restrict the invention in any way.

BRIEF DESCRIPTION OF DRAWINGS

The invention will be explained in more detail in the following on the basis of a drawing showing just one exemplary embodiment.

FIG. 1 schematically shows an actuator according to the invention for use in motor vehicles in the form of a motor vehicle door actuator, and in particular a sliding door drive, which is reduced to the components that are essential to the invention.

DETAILED DESCRIPTION

FIG. 1 depicts an actuator for use in motor vehicles. In the present case, said actuator is a motor vehicle door actuator, and in particular a sliding door drive. In its basic design, this firstly comprises a drive 1. According to the exemplary embodiment, the drive 1 operates by means of an electric motor, therefore having in detail an electric motor optionally in conjunction with a transmission, and in the present case a cable drum. However, this is not compulsory. This is because the drive 1 can operate manually just as well. In this case, a flexible drive means 2 that is connected to the drive 1 and on which said drive can act is not acted upon by the traction shown in FIG. 1, for example by means of the electric motor, but optionally by means of the transmission and the cable drum, but tensile forces acting on the drive means 2 are manually applied. For this purpose, the drive may be formed as a handle, for example, which is manually acted upon by a user.

An actuating member 3 is driven by the flexible drive means 2, which member is a sliding door 3 or a corresponding door leaf that is shown schematically in FIG. 1. This is, of course, not compulsory. The actuating member 3 may just as well be formed as a locking bolt, a liftable or lowerable windowpane or the like, for example, as is explained in detail in the prior art that is talked about in the introductory part of the description.

According to the invention, the flexible drive means 2 is predominantly made of plastics material. This means that the plastics material used constitutes the main component of the flexible drive means 2 in terms of weight, therefore making up more than 50 wt. % of the drive means 2. The plastics material used is a thermoplastic polymer. In addition, the plastics material used is high-tensile, as has already been described in the introductory part of the description.

In fact, according to the sectional view in FIG. 1, the flexible drive means 2 predominantly consists of plastics material fibers 4, 4'. The plastics material fibers 4, 4' are each combined to form plastics material threads 5. Individual plastics material threads 5 are also stranded together and thereby as a whole form a plastics material cable 6. This is, of course, only an example and is not compulsory.

The drive means 2 may also comprise a cable sheath 7 that receives the plastics material cable 6 in the interior, surrounds the plastics material cable 6 arranged in the interior and protects it against damage. At the same time, the cable sheath 7 acts as an abutment, similar to a cable sheath in a Bowden cable according to the prior art. The cable sheath 7 is, however, not compulsory as a whole and is superfluous in principle.

The plastics material fibers 4, 4' comprise a fineness-based maximum highest tensile force of at least 20 cN/dtex, and in particular a fineness-based maximum highest tensile force of at least 30 cN/dtex. The drive means 2 can also be formed as a composite structure of plastics material fibers 4, 4' as the main component and at least one additional component. It is therefore conceivable, for example, for HPPE (High Performance Polyethylene) plastics material fibers 4 to be used on the one hand and polyamide plastics material fibers 4' to be used on the other hand, which, when combined as per the embodiment, define the particular plastics material thread 5 that is consequently formed as a composite structure of the HPPE plastics material fibers 4 and the polyamide plastics material fibers 4'.

Instead of the polyamide plastics material fibers 4' as the additional component of the flexible drive means 2, so to speak, other fibers can also form a composite structure with the HPPE plastics material fibers 4. Examples of such fibers as the additional component are carbon fibers or glass fibers, as well as steel fibers. However, this is not shown in detail.

The invention claimed is:

1. An actuator for use in a motor vehicle door actuator, the actuator comprising:

a drive that operates either manually or by an electric motor;

a flexible drive means, which is connected to the drive and on which the drive can act; and an actuating member that is driven by the drive means, wherein the actuating member comprises a sliding door, wherein the drive means is attached to the sliding door, wherein the drive is configured to move the sliding door from a first position to a second position by winding a portion of the drive means at a cable drum to pull the sliding door towards the drive, and wherein the drive means is predominantly made of plastics material, wherein the drive means is formed as a composite structure of plastics material fibers combined to form multiple plastics material threads, wherein the multiple plastics material threads are twisted together to form a plastics material cable.

2. The actuator according to claim 1, wherein the plastics material is a polymer.

3. The actuator according to claim 2, wherein the plastics material is a thermoplastic polymer.

4. The actuator according to claim 1, wherein the plastics material has tensile strength values of more than 1 gigapascal.

5. The actuator according to claim 4, wherein the plastics material has tensile strength values of more than 2 gigapascals.

6. The actuator according to claim 5, wherein the plastics material has tensile strength values of more than 3 gigapascals.

7. The actuator according to claim 1, wherein the plastics material fibers have a fineness-based maximum tensile force of at least 20 cN/dtex.

8. The actuator according to claim 7, wherein the plastics material fibers have a fineness-based maximum tensile force of more than 30 cN/dtex.

9. The actuator according to claim 1, wherein the drive means is formed as a composite structure of plastics material fibers as one main component and at least one additional component.

10. The actuator according to claim 9, wherein steel fibers, natural fibers, different plastics material fibers, carbon fibers, or glass fibers are used as the at least one additional component.

11. The actuator according to claim 10, wherein the plastics material fibers includes polyethylene.

12. The actuator according to claim 1, wherein the multiple plastics material threads are formed of material fibers formed of at least two different plastics material fibers.

13. The actuator according to claim 12, wherein the at least two different plastics material fibers includes polyethylene plastics material fibers and polyamide plastics material fibers.

14. The actuator according to claim 1, further comprising a cable sheath that surrounds the one or more plastics material cables.

15. The actuator according to claim 1, wherein the plastics material constitutes greater than 50% weight of the drive means.

16. The actuator according to claim 1, wherein the plastics material have a melting point that is higher than 140 degrees Celsius.

* * * * *